United States Patent
Allen

(10) Patent No.: US 11,378,168 B2
(45) Date of Patent: Jul. 5, 2022

(54) DIRECT ACTING ELECTRONIC LOCKING DIFFERENTIAL

(71) Applicant: Eaton Intelligent Power Limited, Dublin (IE)

(72) Inventor: Jordan Robert Allen, Galesburg, MI (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 17/307,093

(22) Filed: May 4, 2021

(65) Prior Publication Data

US 2021/0254697 A1    Aug. 19, 2021

Related U.S. Application Data

(63) Continuation of application No. PCT/EP2019/025375, filed on Nov. 1, 2019.

(60) Provisional application No. 62/755,809, filed on Nov. 5, 2018.

(51) Int. Cl.

| F16H 48/34 | (2012.01) |
|---|---|
| F16H 48/24 | (2006.01) |
| F16H 48/40 | (2012.01) |
| F16D 27/09 | (2006.01) |

(52) U.S. Cl.
CPC ............ *F16H 48/34* (2013.01); *F16H 48/24* (2013.01); *F16H 48/40* (2013.01); *F16D 27/09* (2013.01); *F16H 2048/346* (2013.01)

(58) Field of Classification Search
CPC .... F16H 48/24; F16H 48/34; F16H 2048/346; F16D 27/09; F16D 27/118
See application file for complete search history.

(56) References Cited

U.S. PATENT DOCUMENTS

| 5,030,181 | A | * | 7/1991 | Keller | ............... F16H 48/30 475/150 |
| 5,890,989 | A | * | 4/1999 | Yamazaki | ............ F16H 48/34 475/295 |
| 6,827,661 | B2 | | 12/2004 | Fusegi et al. | |
| 6,945,895 | B2 | | 9/2005 | Fusegi et al. | |
| 6,966,863 | B2 | | 11/2005 | Teraoka et al. | |
| 7,022,040 | B2 | * | 4/2006 | DeGowske | ............ F16H 48/08 475/231 |
| 7,074,150 | B2 | | 7/2006 | Fusegi et al. | |
| 7,862,462 | B2 | | 1/2011 | Fusegi | |
| 7,887,450 | B2 | | 2/2011 | Fusegi et al. | |

(Continued)

FOREIGN PATENT DOCUMENTS

| DE | 202015007761 U1 * | 12/2015 | ............ F16D 11/14 |
| WO | 2015078488 A1 | 6/2015 | |

OTHER PUBLICATIONS

International Search Report and Written Opinion for International Application No. PCT/EP2019/025375 dated Jan. 22, 2020.

*Primary Examiner* — Ernesto A Suarez
*Assistant Examiner* — James J Taylor, II
(74) *Attorney, Agent, or Firm* — RMCK Law Group PLC

(57) ABSTRACT

A lock plate for an electronically actuated locking differential is provided. In one example embodiment, the lock plate includes a base portion having a first side and an opposite second side, a plurality of radially spaced teeth extending outwardly from the first side, and a plurality of standoffs extending outwardly from the second side.

16 Claims, 3 Drawing Sheets

(56) References Cited

U.S. PATENT DOCUMENTS

| | | | |
|---|---|---|---|
| 7,892,134 B2 | 2/2011 | Fusegi | |
| 7,988,584 B2 | 8/2011 | Balenda et al. | |
| 8,265,842 B2 | 9/2012 | Povirk et al. | |
| 8,808,127 B2 | 8/2014 | Seidl et al. | |
| 8,845,475 B2 | 9/2014 | Mayr et al. | |
| 9,169,878 B2 | 10/2015 | Cripsey | |
| 9,341,238 B2 | 5/2016 | Peura et al. | |
| 9,476,460 B2* | 10/2016 | Seidl | F16D 27/09 |
| 9,556,945 B2* | 1/2017 | Fox | F16H 48/34 |
| 9,616,746 B2 | 4/2017 | Peura et al. | |
| 9,797,495 B2 | 10/2017 | Inose et al. | |
| 9,835,209 B2 | 12/2017 | Onitake et al. | |
| 9,878,615 B2 | 1/2018 | Kamitani et al. | |
| 9,897,187 B2 | 2/2018 | Onitake et al. | |
| 9,970,525 B2* | 5/2018 | Zaers | F16H 48/08 |
| 9,989,140 B2 | 6/2018 | Onitake et al. | |
| 10,167,939 B2 | 1/2019 | Onitake et al. | |
| 10,173,525 B2 | 1/2019 | Kamitani et al. | |
| 2003/0184171 A1 | 10/2003 | Teraoka et al. | |
| 2007/0197338 A1 | 8/2007 | Fusegi | |
| 2016/0341257 A1 | 11/2016 | Yamanaka et al. | |
| 2017/0191556 A1* | 7/2017 | Cochren | F16H 48/34 |
| 2017/0254400 A1 | 9/2017 | Onitake et al. | |
| 2017/0292596 A1 | 10/2017 | Kamitani et al. | |
| 2018/0038422 A1 | 2/2018 | Yoshisaka et al. | |

\* cited by examiner

DIRECT ACTING ELECTRONIC LOCKING DIFFERENTIAL

CROSS-REFERENCE TO RELATED APPLICATIONS

This application is a continuation of International Application No. PCT/EP2019/025375 filed Nov. 1, 2019, which claims the benefit of U.S. Provisional Application No. 62/755,809, filed Nov. 5, 2018. The disclosure of the above application is incorporated herein in its entirety by reference thereto.

FIELD

The present disclosure relates generally to electronically actuated locking differentials and, more particularly, to a lock plate for an electronically actuated locking differential.

BACKGROUND

In automotive applications, an electronically actuated locking differential of the related art may be actuated electronically and is designed for forward-wheel-drive (FWD), rear-wheel-drive (RWD), all-wheel-drive (AWD), and four-wheel-drive (4WD) vehicles to allow the differential to be locked or unlocked when it is so desired. The driver can lock the front and/or rear wheels by manually activating a switch or button mounted to a dash or console of the vehicle. However, as vehicles and associated systems become more complex, vehicle component packaging also becomes more challenging. Accordingly, it is desirable to provide a more compact electronically actuated locking differential.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

In one aspect, a lock plate for an electronically actuated locking differential is provided. In one example embodiment, the lock plate includes a base portion having a first side and an opposite second side, a plurality of radially spaced teeth extending outwardly from the first side, and a plurality of standoffs extending outwardly from the second side.

In addition to the foregoing, the described lock plate may include one or more of the following features: wherein the standoffs of the plurality of standoffs are integrally formed with the base portion; wherein the standoffs of the plurality of standoffs are circumferentially spaced about the base portion; wherein each standoff of the plurality of standoffs includes a groove configured to receive a snap ring; wherein each standoff includes a shoulder portion configured to abut against an armature of an electronic actuator; wherein each standoff includes an outer lip, the groove disposed between the outer lip and the shoulder portion; and wherein each standoff includes a pair of opposed straight walled portions and a pair of opposed rounded portions.

In another aspect, an electronically actuated locking differential is provided. In one example embodiment, the electronically actuated locking differential includes a gear case having opposite first and second ends and a plurality of slots formed in the first end, a differential gear set disposed in the gear case, and a lock plate disposed at the gear case first end and configured to selectively engage the differential gear set. The lock plate includes a plurality of standoffs extending through plurality of slots formed in the gear case first end. An electronic actuator is disposed at the gear case first end and includes a stator and an armature. The electronic actuator is operable between an unlocked first mode where the lock plate does not lockingly engage the differential gear set, and a locked second mode where the when the stator is energized, the armature is pulled toward the gear case first end such that the lock plate is pushed into locking engagement with the differential gear set to thereby lock a pair of axle shafts.

In addition to the foregoing, the described electronically actuated locking differential may include one or more of the following features: wherein the differential gear set includes a first side gear and a second side gear, the lock plate configured to selectively lockingly engage the first side gear in the locked second mode; wherein the lock plate comprises a base portion having a first side and an opposite second side, a plurality of radially spaced teeth extending outwardly from the first side, and the plurality of standoffs extending outwardly from the second side; and wherein the standoffs of the plurality of standoffs are integrally formed with the base portion.

In addition to the foregoing, the described electronically actuated locking differential may include one or more of the following features: wherein the standoffs of the plurality of standoffs are circumferentially spaced about the base portion; wherein each standoff of the plurality of standoffs includes a groove configured to receive a snap ring; wherein each standoff includes a shoulder portion configured to abut against an armature of an electronic actuator; wherein each standoff includes an outer lip, the groove disposed between the outer lip and the shoulder portion; and wherein each standoff includes a pair of opposed straight walled portions and a pair of opposed rounded portions.

In addition to the foregoing, the described electronically actuated locking differential may include one or more of the following features: a biasing mechanism disposed between the first side gear and the lock plate, the biasing mechanism configured to bias the lock plate out of engagement with the first side gear; wherein each slot formed in the gear case includes a pair of opposed straight wall portions and a pair of rounded end portions; wherein the lock plate is disposed between the first side gear and the stator; and wherein the stator and armature are disposed outside of the gear case and the lock plate base portion is disposed within the gear case.

BRIEF DESCRIPTION OF THE DRAWINGS

The present disclosure will become more fully understood from the detailed description and the accompanying drawings, wherein.

DETAILED DESCRIPTION

Figure 1:
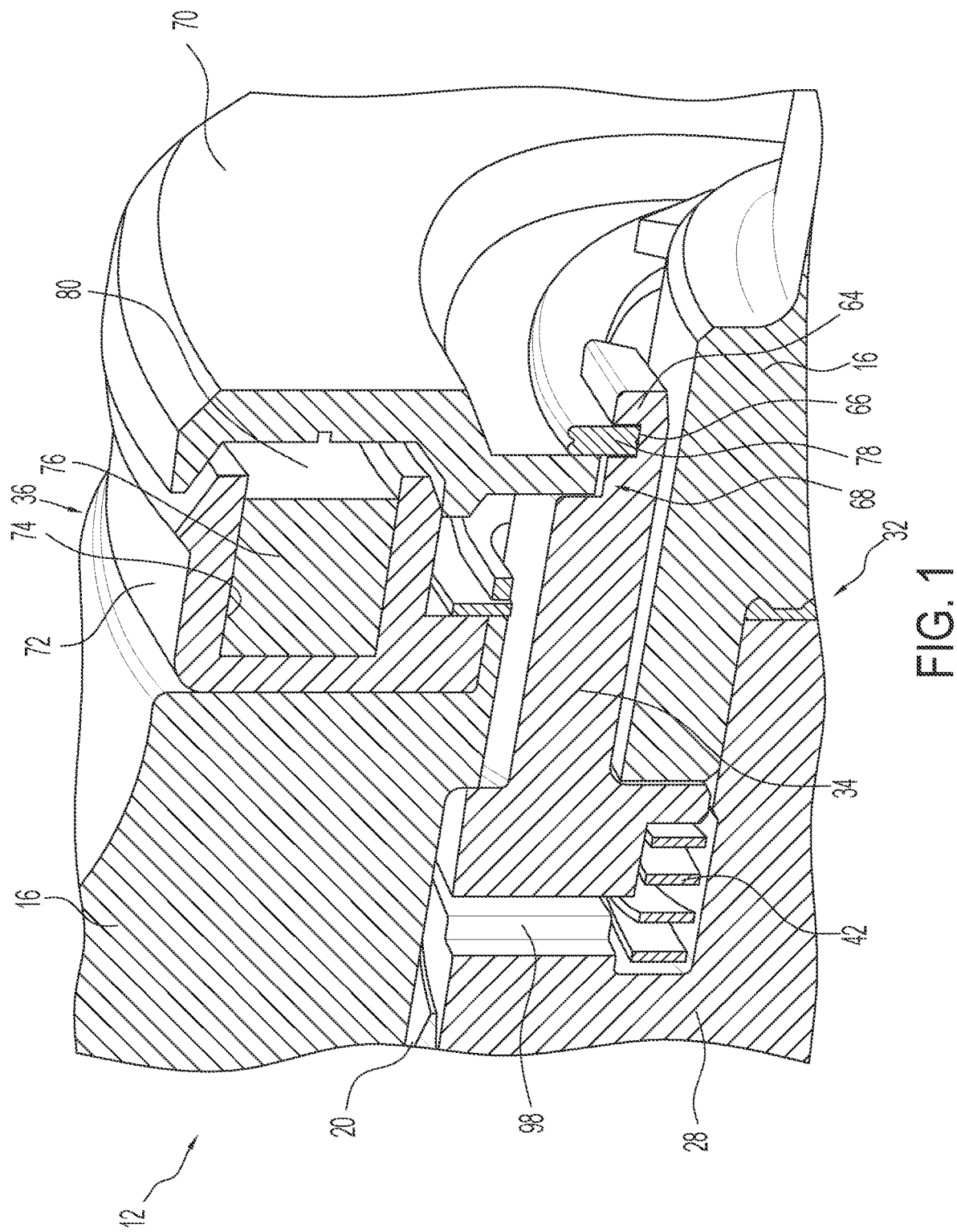
FIG. 1 is a sectional view of an electronically actuated locking differential constructed in accordance to one example of the present disclosure.

With initial reference to FIG. 1, an electronically actuated locking differential is generally indicated at 10. The electronically actuated locking differential 10 generally includes a gear case 12 formed by coupling (e.g., bolting) a hub portion (not shown) and a housing portion 16. In other embodiments, gear case 12 may be a one-piece housing 16. Torque input to the differential is typically by an input ring gear (not shown), which may be attached to a flange (not shown) of the gear case 12. Each of the hub portion and the housing portion 16 of the gear case 12 may be mounted to a bearing set (not shown) to provide rotational support for the differential 10 relative to an outer housing or carrier (not shown).

The gear case 12 defines a gear chamber 20, which generally supports a differential gear set including a pair of input pinion gears (not shown) rotatably mounted on a pinion shaft (not shown), which is secured relative to the gear case 12 by any suitable mechanism. The pinion gears are meshingly engaged with a respective pair of left and right side gears 28 (only one shown). The side gears 28 define respective sets of internal, straight splines 30 that are adapted to be in splined engagement with mating external splines on a respective pair of left and right axle shafts (not shown).

The electronically actuated locking differential 10 further includes a rotation prevention mechanism 32 configured to selectively prevent relative rotation of the left and right axle shafts. The rotation prevention mechanism 32 is disposed at least partially within gear case 12 and generally includes a lock plate 34 operably associated with side gear 28 (the first output gear), and an electronic actuator 36.

Figure 2:
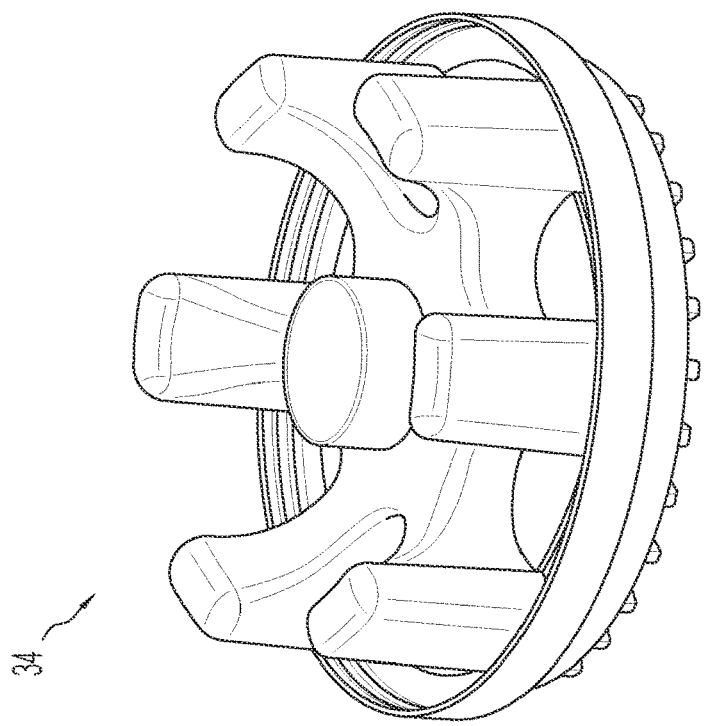
FIG. 2 is a perspective view of an example near net-forged lock plate of the electronically actuated locking differential shown in FIG. 1 before machining.

As illustrated in FIG. 2, in the example embodiment, the lock plate 34 is near net forged for reduced weight and tapered for die release. The near net forged lock plate 34 is subsequently worked (e.g., machined) to form the lock plate 34 shown in FIGS. 3 and 4.

Figure 3:
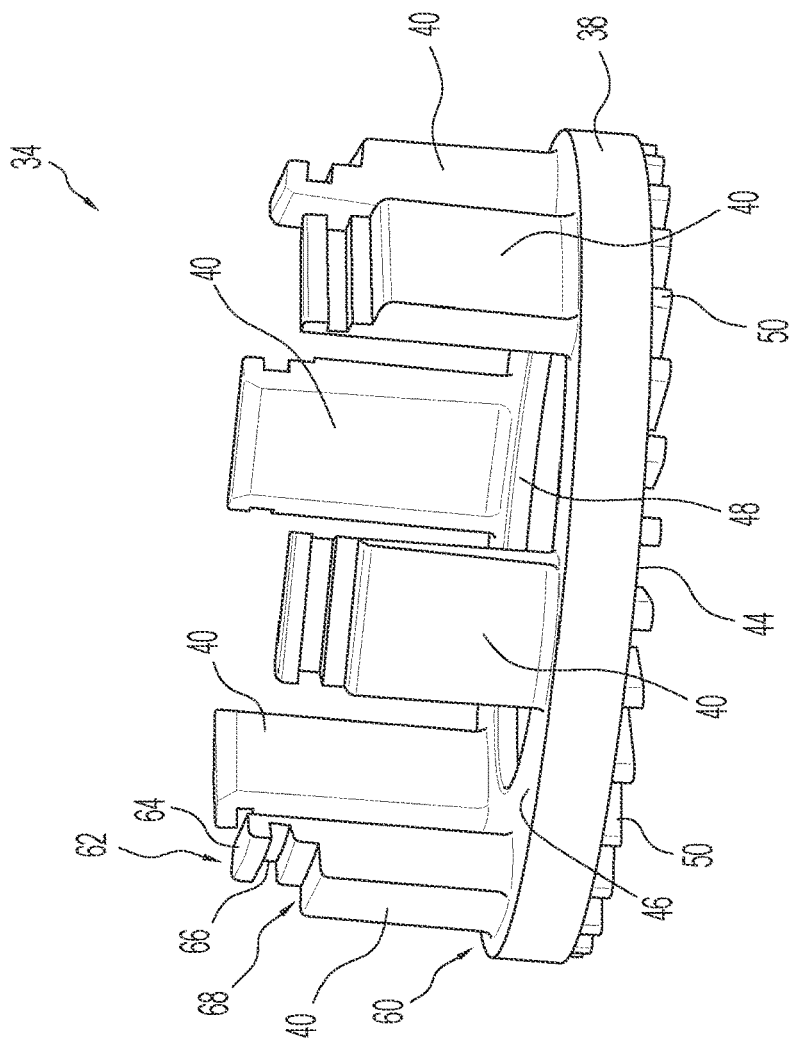
FIG. 3 is a perspective view of the lock plate shown in FIG. 2 after machining.
Figure 4:
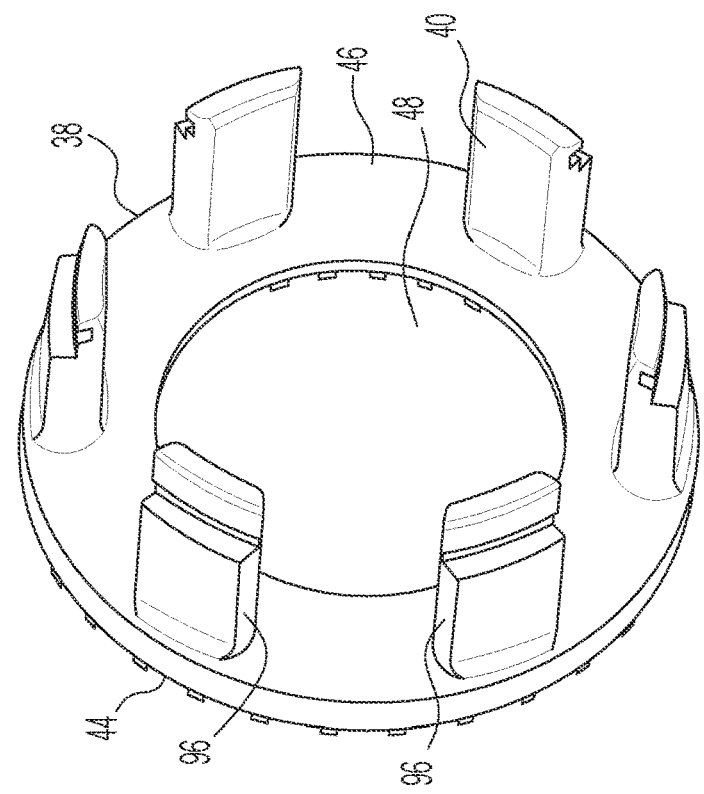
FIG. 4 is another perspective view of the lock plate shown in FIG. 3.

With additional reference to FIGS. 3 and 4, the lock plate 34 is spaced apart from the side gear 28 and is slidable along the outer surface of side gear 28. In the example embodiment, the lock plate 34 generally includes a base portion 38 and a plurality of standoffs 40. The lock plate 34 is biased toward a non-actuated, unlocked mode by a biasing mechanism 42 such as, for example, a wave spring 42 (see FIG. 1).

As shown in FIG. 3, the base portion 38 is generally annular and includes a first side 44, an opposite second side 46, and a generally circular central aperture 48. The first side 44 includes a plurality of radially spaced dog teeth 50 configured to selectively engage the side gear 28, as described herein in more detail. As illustrated, the plurality of standoffs 40 extend outwardly from the base portion second side 46.

In the example embodiment, each standoff 40 includes a proximal end 60 and a distal end 62. The proximal end 60 is integrally coupled with the base portion second side 46 such that standoffs 40 extend orthogonal to or substantially orthogonal thereto. The distal end 62 generally defines an outer lip 64, a groove 66, and a shoulder portion 68 formed therein as the standoff 40 extends from the distal end 62 toward the proximal end 60.

With continued reference to FIG. 1, in the example embodiment, the electronic actuator 36 is disposed primarily external to the gear case 12 in a location opposite the flange at a bell end of the gear case 12 and adjacent to side gear 28. The electronic actuator 36 generally includes an armature 70 and a stator 72, which defines a cavity 74 configured to receive an electromagnetic coil 76. The coil 76 is configured to be energized via electrical leads (not shown) and receive a current, such as direct current (DC), from a power source such as a vehicle battery (not shown).

As shown in FIG. 1, in the example embodiment, an inner diameter portion of the armature 70 abuts against lock plate shoulder portion 68. The armature 70 is secured in place to the lock plate 34 by a snap ring 78, which is received within the groove 66 located between the out lip 64 and the shoulder portion 68 of the standoff 40. That stator 72 is generally annular and spaced apart from the armature 70 by a gap 80. When energized, the stator 72 generates a magnetic field, which draws the armature 70 toward the stator 72 to close the gap 80. This movement of armature 70 is subsequently imparted to the lock plate 34 and slides the lock plate 34 leftward (as shown in FIG. 1) into locking engagement with the side gear 28.

Figure 5:
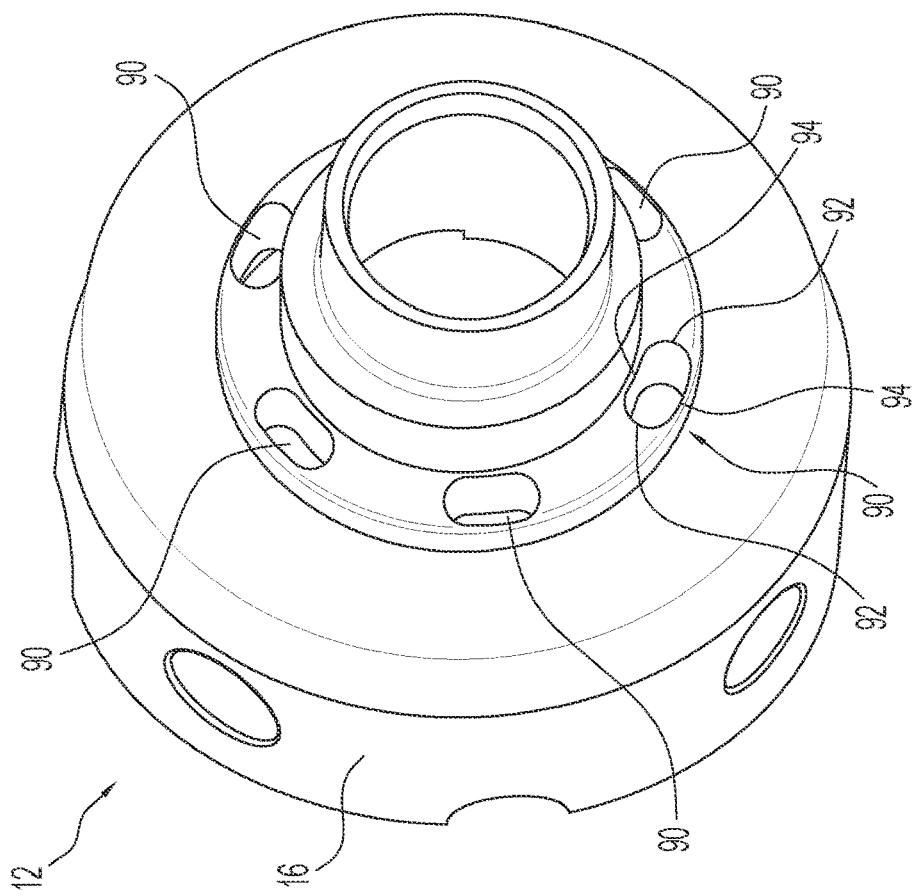
FIG. 5 illustrates an example gear case of the electronically actuated locking differential shown in FIG. 1.

With additional reference to FIG. 5, the gear case 12 is formed with circumferentially spaced slots 90 each configured to receive one standoff 40. In the example embodiment, each slot 90 includes rounded end portions 92 and generally straight wall portions 94. The lock plate standoffs 40 have radial features 96 (FIG. 4) corresponding to the rounded end portions 92 that are cut back with a reduced radial angle of center to allow for lash. Such an arrangement with standoffs 40 extending through the slots 90 of gear case 12 advantageously enables higher loads and reduced stresses. In this way, all or substantially all of the torque goes through the standoffs 40.

During normal, straight-ahead operation of a vehicle within which the differential 10 is employed, no differentiation occurs between the left and right axle shaft or side gears 28. Therefore, the pinion gears do not rotate relative to the pinion shaft. As a result, the gear case 12, pinion gears, and side gears 28 all rotate about an axis of rotation as if the gear case 12, pinion gears, and side gears 28 are a solid unit.

When direct current (DC) power is supplied to the electromagnetic coil 60, magnetic energy is generated within the stator 72, which creates an attractive force between the stator 72 and the armature 70, thereby causing the armature 70 to move toward the gear case 12. This in turn causes the lock plate 34 to move leftward (as shown in FIG. 1) toward and into locking engagement with side gear 28 as it compresses biasing mechanism 42. In this way, lock plate teeth 50 meshingly engage side gear teeth 98 (FIG. 1) until lock plate 34 exerts a required retarding torque on the side gear 28, locking it to the differential case 12 and thus locking the left and right axle shafts independent of driveline rotation.

The differential 10 may be controlled manually, wherein a driver of the vehicle manually selects "locked" mode (rather than "unlocked" mode) to operate the differential 10. For example, when, say the vehicle is at rest, the driver simply manually activates a switch or button (not shown), such as a simple momentary-type "on/off" toggle or rocker switch or push button, mounted to a dash or console (not shown) of the vehicle. In this way, an electric circuit (not shown) is closed, thereby turning on current in the circuit and a lamp (not shown) located in or near the toggle switch or push button to indicate to the driver that the differential is actuated. Current flows in the circuit and ultimately to the electromagnetic coil 76 of the differential 10. The differential 10 then operates in the "locked" mode (i.e., when the vehicle is in first gear or reverse). In this way, the first output gear 28 is locked relative to the gear case 12, preventing any further differentiation between the first output gear 28 and gear case 12.

Described herein are systems and methods for a lock plate of an electronic locking differential. The lock plate includes near net-forged integrated standoffs on an opposing surface from the lock teeth. The standoffs are straight walled and orthogonal to the differential centerline. The standoffs increase the interface area between the lock plate and differential case to reduce contact stress and provide a robust design. The lock plate improves unlock performance, provides allowance for lock detection integration, and reduces bill of material complexity. Additionally, the lock plate accommodates the use of lower cost materials and heat treatment options, as well as improves compatibility assembling the differential into a one-piece differential case.

The foregoing description of the examples has been provided for purposes of illustration and description. It is not intended to be exhaustive or to limit the disclosure. Individual elements or features of a particular example are generally not limited to that particular example, but, where applicable, are interchangeable and can be used in a selected example, even if not specifically shown or described. The same may also be varied in many ways. Such variations are not to be regarded as a departure from the disclosure, and all such modifications are intended to be included within the scope of the disclosure.

What is claimed is:

1. A lock plate for an electronically actuated locking differential having an armature, the lock plate comprising:
    a base portion having a first side and an opposite second side;
    a plurality of radially spaced teeth extending outwardly from the first side; and
    a plurality of standoffs extending outwardly from the second side, each standoff of the plurality of standoffs extending from a proximal end to a distal end and having an outer diameter and an inner diameter, the outer diameter including (i) a groove configured to receive a snap ring and (ii) a shoulder portion arranged closer to the proximal end than the groove, wherein a portion of the armature is disposed between each standoff and the snap ring at the shoulder portion.

2. The lock plate of claim 1, wherein the standoffs of the plurality of standoffs are integrally formed with the base portion.

3. The lock plate of claim 1, wherein the standoffs of the plurality of standoffs are circumferentially spaced about the base portion.

4. The lock plate of claim 1, wherein each standoff includes an outer lip, the groove disposed between the outer lip and the shoulder portion.

5. The lock plate of claim 4, wherein each standoff includes a pair of opposed straight walled portions and a pair of opposed rounded portions.

6. An electronically actuated locking differential comprising:
    a gear case having opposite first and second ends and a plurality of slots formed in the first end;
    a differential gear set disposed in the gear case;
    a lock plate disposed at the gear case first end and configured to selectively engage the differential gear set, wherein the lock plate includes a plurality of standoffs extending through the plurality of slots formed in the gear case first end, each standoff of the plurality of standoffs extending from a proximal end to a distal end and having an outer diameter and an inner diameter, the outer diameter including (i) a groove configured to receive a snap ring and (ii) a shoulder portion arranged closer to the proximal end than the groove; and
    an electronic actuator disposed at the gear case first end and having a stator and an armature, wherein a portion of the armature is disposed between each standoff and the snap ring at the shoulder portion,
    wherein the electronic actuator is operable between an unlocked first mode where the lock plate does not lockingly engage the differential gear set, and a locked second mode wherein when the stator is energized, the armature is pulled toward the gear case first end such that the lock plate is pushed into locking engagement with the differential gear set to thereby lock a pair of axle shafts.

7. The electronically actuated locking differential of claim 6, wherein the differential gear set includes a first side gear and a second side gear, the lock plate configured to selectively lockingly engage the first side gear in the locked second mode.

8. The electronically actuated locking differential of claim 7, further comprising a biasing mechanism disposed between the first side gear and the lock plate, the biasing mechanism configured to bias the lock plate out of engagement with the first side gear.

9. The electronically actuated locking differential of claim 7, wherein the lock plate is disposed between the first side gear and the stator.

10. The electronically actuated locking differential of claim 6, wherein the lock plate comprises:
    a base portion having a first side and an opposite second side;
    a plurality of radially spaced teeth extending outwardly from the first side; and
    the plurality of standoffs extending outwardly from the second side.

11. The electronically actuated locking differential of claim 10, wherein the standoffs of the plurality of standoffs are integrally formed with the base portion.

12. The electronically actuated locking differential of claim 10, wherein the standoffs of the plurality of standoffs are circumferentially spaced about the base portion.

13. The electronically actuated locking differential of claim 10, wherein the stator and the armature are disposed outside of the gear case and the lock plate base portion is disposed within the gear case.

14. The electronically actuated locking differential of claim 6, wherein each standoff includes an outer lip, the groove disposed between the outer lip and the shoulder portion.

15. The electronically actuated locking differential of claim 14, wherein each standoff includes a pair of opposed straight walled portions and a pair of opposed rounded portions.

16. The electronically actuated locking differential of claim 6, wherein each slot formed in the gear case includes a pair of opposed straight wall portions and a pair of rounded end portions.

* * * * *